(12) United States Patent
Katagiri et al.

(10) Patent No.: US 9,048,469 B2
(45) Date of Patent: Jun. 2, 2015

(54) HOLLOW-FIBER MEMBRANE MODULE FOR MOISTURE EXCHANGE

(75) Inventors: Toshikatsu Katagiri, Wako (JP); Hiromoto Ikada, Wako (JP); Yohei Hidaka, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 736 days.

(21) Appl. No.: 13/381,529

(22) PCT Filed: Jul. 20, 2010

(86) PCT No.: PCT/JP2010/062171
§ 371 (c)(1),
(2), (4) Date: Dec. 29, 2011

(87) PCT Pub. No.: WO2011/010636
PCT Pub. Date: Jan. 27, 2011

(65) Prior Publication Data
US 2012/0111967 A1    May 10, 2012

(30) Foreign Application Priority Data
Jul. 24, 2009  (JP) .................................. 2009-173489

(51) Int. Cl.
*B01F 3/04* (2006.01)
*H01M 8/04* (2006.01)
*B01D 63/02* (2006.01)

(52) U.S. Cl.
CPC ........... *H01M 8/04171* (2013.01); *B01D 63/02* (2013.01); *B01D 2313/10* (2013.01); *B01D 2313/12* (2013.01); *H01M 8/04149* (2013.01); *Y02E 60/50* (2013.01)

(58) Field of Classification Search
CPC ............... B01D 63/02; B01D 2313/10; B01D 2313/12; H01M 8/04149; H01M 8/04171; Y02E 60/50
USPC .................................. 261/23.1, 101, 102, 104
See application file for complete search history.

(56) References Cited

U.S. PATENT DOCUMENTS 4,007,601 A * 2/1977 Webbon ......................... 62/100
4,146,597 A * 3/1979 Eckstein et al. ............... 261/104
(Continued)

FOREIGN PATENT DOCUMENTS

CN        1723076 A      1/2006
JP     61-042874 A      3/1986
(Continued)

OTHER PUBLICATIONS

International Search Report of PCT/JP2010/062171, mailing date Nov. 2, 2010.
(Continued)

*Primary Examiner* — Charles Bushey
(74) *Attorney, Agent, or Firm* — Westerman, Hattori, Daniels & Adrian, LLP

(57) ABSTRACT

A hollow-fiber membrane module for moisture exchange including a tubular outer case, a tubular inner case, plural hollow-fiber membranes, sealing portions, an inlet, an outlet, a first flow path, a second flow path, and a tubular porous member. The inner case is coaxially contained in the outer case so as to have a space therebetween. The hollow-fiber membranes are filled in the space and extend in the axial direction. The sealing portions are provided to both ends of the space so as to fix the plural hollow-fiber membranes and to seal the space. The first flow path extends from one end side of the hollow-fiber membranes to the other end side via insides of the hollow-fiber membranes. The second flow path extends from the inlet to the outlet via outsides of the hollow-fiber membranes in the space. The tubular porous member is inserted between the hollow-fiber membranes.

6 Claims, 3 Drawing Sheets

(56) References Cited

U.S. PATENT DOCUMENTS

| | | | |
|---|---|---|---|
| 4,666,469 A * | 5/1987 | Krueger et al. | 95/54 |
| 4,911,846 A | 3/1990 | Akasu et al. | |
| 5,013,331 A * | 5/1991 | Edwards et al. | 95/22 |
| 5,176,725 A * | 1/1993 | Puri et al. | 96/8 |
| 6,136,073 A * | 10/2000 | Coan et al. | 96/8 |
| 6,471,195 B2 * | 10/2002 | Shimanuki et al. | 261/44.1 |
| 2001/0015500 A1 | 8/2001 | Shimanuki et al. | |
| 2005/0121812 A1 | 6/2005 | Okada | |
| 2005/0241482 A1 | 11/2005 | Berger et al. | |
| 2007/0125697 A1 | 6/2007 | Lee et al. | |

FOREIGN PATENT DOCUMENTS

| | | |
|---|---|---|
| JP | 2-086817 A | 3/1990 |
| JP | 6-132038 A | 5/1994 |
| JP | 9-192442 A | 7/1997 |
| JP | 2002-102663 A | 4/2002 |
| JP | 2002-147802 A | 5/2002 |
| JP | 2002-289229 A | 10/2002 |
| JP | 2002-303435 A | 10/2002 |
| JP | 2003-164735 A | 6/2003 |
| JP | 2004-311287 A | 11/2004 |
| JP | 2005-040675 A | 2/2005 |
| JP | 2006-003069 A | 1/2006 |
| JP | 2007-309574 A | 11/2007 |
| JP | 2007-323982 A | 12/2007 |
| WO | 2004/043578 A1 | 5/2004 |
| WO | 2005/046848 A1 | 5/2005 |

OTHER PUBLICATIONS

Extended European Search Report dated Nov. 27, 2013, in corresponding to European Application No. 10802256.7.

Chinese Office Action dated Sep. 11, 2013, issued in corresponding Chinese Patent Application No. 201080031460.0, w/ English translation.

* cited by examiner

HOLLOW-FIBER MEMBRANE MODULE FOR MOISTURE EXCHANGE

TECHNICAL FIELD

The present invention relates to a hollow-fiber membrane module for moisture exchange, which may be suitably used in a fuel cell system, for example. Specifically, the present invention relates to a technique for improving efficiency of humidifying a dry gas.

BACKGROUND ART

A fuel cell formed of a fuel cell stack is generally known. In the fuel cell stack, plural unit cells, for example, several hundred unit cells, are stacked. The unit cell has a laminated structure in which a separator is laminated on each side of a plate-shaped membrane electrode assembly (MEA). The MEA has a three-layer structure in which an electrolyte membrane, made of ion-exchange resin or the like, is held between a pair of electrodes. The pair of electrodes is made of a positive electrode (air electrode, cathode) and a negative electrode (fuel electrode, anode). In such a fuel cell, for example, a fuel gas is supplied to a gas flow path which faces a gas diffusion electrode at the side of the fuel electrode, and an oxidant gas is supplied to a gas flow path which faces a gas diffusion electrode at the side of the air electrode. As a result, electrochemical reactions occur, and electricity is generated.

In order to stabilize the electrochemical reactions, the MEA is desirably humidified. For example, a fuel cell system is disclosed in Japanese Unexamined Utility Model Application Publication No. 61-3671. In this fuel cell, water is generated by the power generation and is then supplied to a fuel gas in a fuel gas flow path as water vapor. Therefore, an off-gas, which is exhausted from an anode and has increased water vapor partial pressure, is used as a humidifying gas to humidify a fuel gas before it is used.

Recently, in accordance with a trend toward increasing performance of fuel cells, the thickness of the MEA has been decreased. As a result, water, which is generated by the electrochemical reaction and comes out to the side of the air electrode, tends to move to the side of the fuel electrode. Therefore, when the fuel gas is humidified, the fuel electrode is excessively humidified, whereby a phenomenon called "flooding" occurs and prevents contact of the fuel with the fuel electrode. In contrast, it is known that there may be a case in which the electrochemical reaction is not much affected even when the air electrode is excessively humidified. Accordingly, a technique of humidifying the oxidant gas has recently become more important than the technique of humidifying the fuel gas.

A conventional fuel cell system for automobiles, which humidifies an oxidant gas, is disclosed in Japanese Patent Application Laid Open No. 6-132038, for example. This fuel cell system has a humidifier including spaces that are divided by a moisture permeable membrane. By supplying an unused dry oxidant gas to one of the spaces and by supplying a humidified off-gas of the oxidant gas to the other space, moisture migrates from the off-gas to the oxidant gas through the moisture permeable membrane.

In this technique, moisture migrates through the moisture permeable membrane with an approximately flat shape due to contact of the off-gas with the oxidant gas from each side thereof. Therefore, the contact area is small, whereby the moisture migration does not overtake the continuous supply of the oxidant gas, and humidifying efficiency is low.

In order to overcome this problem, techniques are disclosed in, for example, Japanese Patent Applications Nos. 2002-147802, 2004-311287, 2005-40675, and 2007-323982. In these techniques, hollow-fiber membranes are filled in a humidifier, an unused oxidant gas is supplied into insides of the hollow-fiber membranes, and an off-gas is supplied so as to contact outside walls of the hollow-fiber membranes. Thus, moisture migration is performed through the hollow-fiber membranes. According to these techniques, since a lot of fine hollow-fiber membranes are filled in the humidifier, the contact area for moisture migration is extremely increased. Therefore, the humidifying efficiency is better than that in the technique disclosed in Japanese Unexamined Utility Model Application Publication No. 61-3671.

The hollow-fiber membranes swell by absorbing moisture and change in dimensions when the moisture migrates. Therefore, the hollow-fiber membranes must be filled in the humidifier by providing distances therebetween, and the hollow-fiber membranes cannot be densely filled in the humidifier. Thus, the hollow-fiber membranes have distances therebetween, and are elastically deformable. Consequently, when an off-gas is supplied to the humidifier, the off-gas pushes aside the hollow-fiber membranes at an inlet portion at which the gas flow rate is the greatest, whereby large spaces are formed. The off-gas flows through the large spaces as bypasses and thereby does not uniformly flow within the humidifier, which decreases the humidifying efficiency.

In order to overcome this problem, according to the technique disclosed in Japanese Patent Application No. 2004-311287, several hollow-fiber membranes are bounded with a rigid rod, and multiple sets are produced. By filling these sets in the humidifier, imbalance of the hollow-fiber membranes is reduced. On the other hand, according to the techniques disclosed in Japanese Patent Applications Nos. 2005-40675 and 2007-323982, a partition plate may be provided to the humidifier. The partition plate guides an off-gas flow path and prevents the hollow-fiber membranes from moving to a specific direction.

However, in the technique disclosed in Japanese Patent Application No. 2004-311287, numerous sets must be produced by binding the hollow-fiber membranes with the rigid rod. Therefore, production steps are increased, which is not preferable. In the techniques disclosed in Japanese Patent Applications Nos. 2005-40675 and 2007-323982, the imbalance of the hollow-fiber membranes is reduced compared with conventional hollow-fiber membranes. However, it is difficult to prevent the imbalance of the hollow-fiber membranes within the area divided by the partition plate. Moreover, since the partition plate cannot be formed into a completely closed structure in order to allow gas to flow, the imbalance of the hollow-fiber membranes at the open portion of the partition plate cannot be prevented.

Disclosure of the Invention

The present invention has been completed so as to solve the above problems in the conventional techniques, and an object of the present invention is to provide a hollow-fiber membrane module for moisture exchange. According to the hollow-fiber membrane module, a dry gas supplied into hollow-fiber membranes is sufficiently humidified before it is used in a fuel cell. Moreover, imbalance of the hollow-fiber membranes filled in a humidifier is reduced, whereby a humidified off-gas is uniformly flowed in the humidifier after it is used in a fuel cell.

The present invention provides a hollow-fiber membrane module for moisture exchange, which includes a tubular outer case, a tubular inner case, plural hollow-fiber membranes, sealing portions, an inlet, an outlet, a first flow path, a second flow path, and a tubular porous member. The inner case is coaxially contained in the outer case so as to have a space therebetween, and the space has both ends. The hollow-fiber membranes are filled in the space and extend in the axial direction, and the hollow-fiber membranes have both ends. The sealing portions are provided to the both ends of the space so as to fix the plural hollow-fiber membranes and to seal the space. The inlet is provided to one of the inner case and the outer case, whereas the outlet is provided to the other. The first flow path extends from a side of the end of the hollow-fiber membranes to a side of the other end via insides of the hollow-fiber membranes. The second flow path extends from the inlet to the outlet via outsides of the hollow-fiber membranes in the space. The tubular porous member is inserted between the hollow-fiber membranes and extends in the space, and is coaxially arranged with the outer case and the inner case.

In the hollow-fiber membrane module for moisture exchange having the above structure, for example, an unused dry gas (an oxidant gas or a fuel gas) is supplied to the first flow path that goes through the inside of the hollow-fiber membranes. In addition, for example, a humidified off-gas is supplied to the second flow path that goes through the outside of the hollow-fiber membranes. Thus, the moisture of the off-gas is made to migrate to the unused gas. Since the tubular porous member is provided in the space that is filled with the hollow-fiber membranes, the hollow-fiber membranes are secured in an area surrounded by the tubular porous member. Therefore, imbalance of the hollow-fiber membranes is reduced even at the vicinity of the inlet at which the gas flow rate is high. Accordingly, large spaces are not formed between the hollow-fiber membranes and the inner case, whereby the off-gas uniformly flows in the hollow-fiber membrane module, and moisture exchange is efficiently performed.

The tubular porous member surrounding the hollow-fiber membranes has an end portion, and at least the end portion is preferably fixed by the sealing portion. According to this aspect, the tubular porous member is prevented from moving even when power is applied thereto by flow of the gas. Therefore, damage to the hollow-fiber membranes due to friction between the tubular porous member and the hollow-fiber membranes is decreased.

Plural tubular porous members, in which diameters differ from each other, may be coaxially provided between the outer case and the inner case. The inlet may be provided to the inner case, whereas the outlet may be provided to the outer case. In this case, a distance between the tubular porous member provided to the innermost and the inner case is preferably less than each distance between the other tubular porous members. According to this aspect, specifically, the hollow-fiber membranes do not greatly move in an area between the innermost tubular porous member and the inner case, that is, at an inner portion in the space surrounded by the outer case and the inner case, at which the gas flow rate is the greatest. Conversely, the inlet may be provided to the outer case, whereas the outlet may be provided to the inner case. In this case, a distance between the tubular porous member provided to the outermost and the outer case is preferably less than each distance between the other tubular porous members. According to this aspect, specifically, the hollow-fiber membranes do not greatly move in an area between the outermost tubular porous member and the outer case, that is, at an outer portion in the space surrounded by the outer case and the inner case, at which the gas flow rate is the greatest.

The hollow-fiber membranes in a dry condition preferably have distances therebetween and distances between the hollow-fiber membranes and the tubular porous member. In addition, the hollow-fiber membranes in a swelled condition preferably contact each other so as to decrease these distances. According to this aspect, the hollow-fiber membranes and the tubular porous member are brought into contact with each other while the hollow-fiber membrane module is operated. Therefore, generation of large spaces along the inner case is securely prevented.

As the tubular porous member, for example, a mesh is preferably used. The mesh can secure the hollow-fiber membranes and allow the gas to flow.

Effects of the Invention

According to the present invention, the hollow-fiber membranes are held and are secured by the tubular porous member at the vicinity of the inlet, at which the imbalance most easily occurs in the hollow-fiber membranes filled in the module. Therefore, the imbalance of the hollow-fiber membranes due to the flow of the off-gas is reduced, whereby the off-gas is uniformly flowed in the module.

REFERENCE NUMERALS

M denotes a hollow-fiber membrane module for moisture exchange, 10 denotes an outer case, 11 denotes a hollow-fiber membrane, 12 denotes an inlet of gas, 13 denotes an outlet of gas, 14 denotes a sealing portion, 15 denotes an inner case, 20 denotes an unused gas (with low humidity), 21 denotes an unused gas (after moisture is exchanged), 22 denotes an off-gas (with high humidity), 23 denotes an off-gas (after moisture is exchanged), 30 denotes a tubular porous member, 31 denotes a first tubular porous member, 32 denotes a second tubular porous member, and 33 denotes a third tubular porous member.

DESCRIPTION OF EMBODIMENTS

Figure 1:
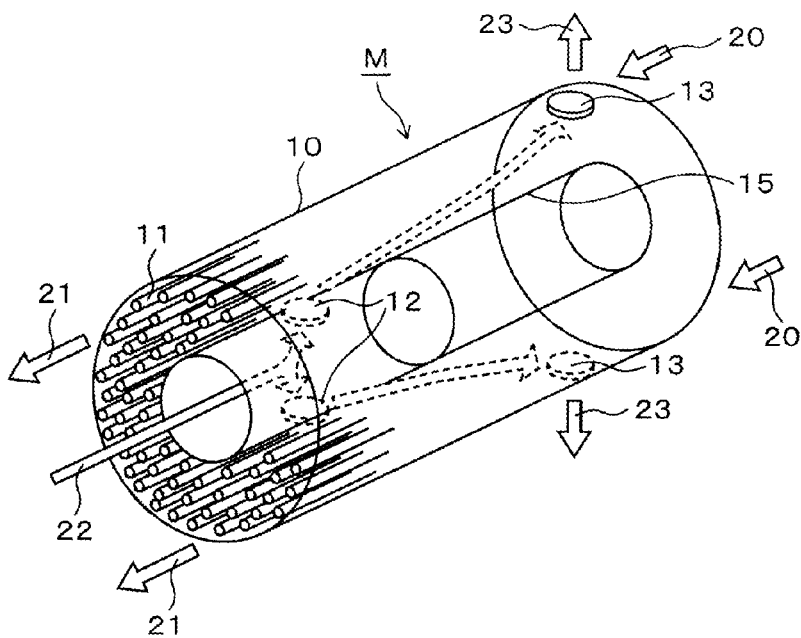
FIG. 1 is a perspective view showing a hollow-fiber membrane module for moisture exchange.
Figure 2:
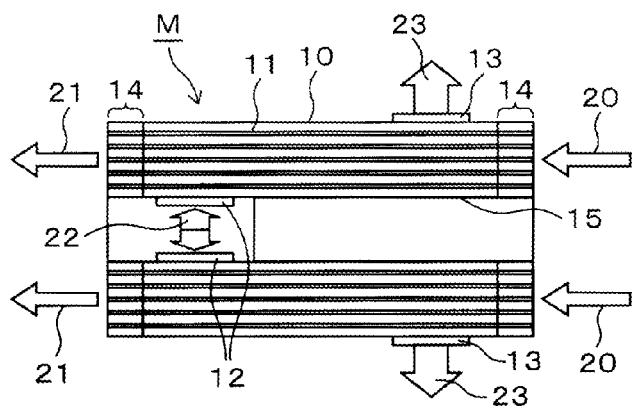
FIG. 2 is a sectional side view showing the hollow-fiber membrane module for moisture exchange in FIG. 1.
Figure 3:
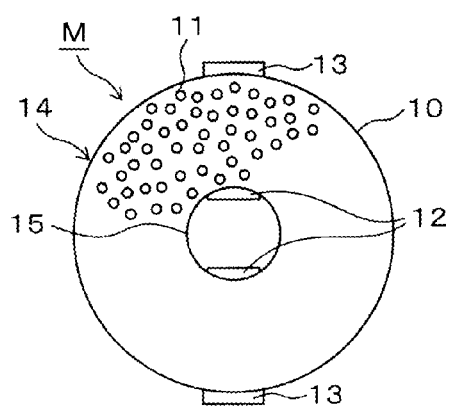
FIG. 3 is a front view showing the hollow-fiber membrane module for moisture exchange in FIG. 1.

Embodiments of the present invention will be described with reference to the figures hereinafter. First, a general structure of a hollow-fiber membrane module for moisture exchange, to which the present invention can be applied, will be described with reference to FIGS. 1 to 3 before description of the embodiments. FIGS. 1 to 3 show a hollow-fiber membrane module M for moisture exchange. The hollow-fiber membrane module M has an outer case 10 which is formed into a tubular shape, and an inner case 15 is coaxially arranged in the outer case 10.

There is a space inside of the outer case 10 and at the outside of the inner case 15 (that is, a space surrounded by the outer case 10 and the inner case 15, which may be simply called a "filling space" hereinafter). This space is filled with plural hollow-fiber membranes 11 in a direction parallel to the axial direction of the outer case 10 and the inner case 15. Since the plural hollow-fiber membranes 11 swell by absorbing moisture, the hollow-fiber membranes 11 are filled at predetermined distances so as to correspond to change in dimensions.

The hollow-fiber membranes 11 have ends at both sides that are fixed to the outer case 10 and the inner case 15 by sealing portions 14. FIG. 1 shows the hollow-fiber membranes 11 that are partially omitted, but the hollow-fiber membranes 11 extend between the sealing portions 14 at both ends. The sealing portions 14 are formed by burying the outsides of the hollow-fiber membranes 11 in the filling space with a synthetic resin and the like. The sealing portions 14 seal only the filling space from the outside. That is, the sealing portions 14 are formed in the filling space and fix the hollow-fiber membranes 11 at both ends of the tubular structure of the outer case 10 and the inner case 15. The hollow insides of the hollow-fiber membranes 11 are not sealed and are communicated with the outside at both ends. In the embodiments, a route from one end sides of the hollow-fiber membranes 11 (arrow 20) to the other ends thereof (arrow 21) via the hollow inside of the hollow-fiber membranes is used as a first flow path.

The inner case 15 is provided with an inlet 12 for the gas. The outer case 10 is provided with an outlet 13 for the gas at the downstream and the opposite side of the inlet 12. In the embodiments, a route from the inlet 12 (arrow 22) to the outlet 13 (arrow 23) via the outsides of the hollow-fiber membranes 11 in the filling space is used as a second flow path. That is, in the inner case 15 and the outer case 10, the inner case 15 is provided with the inlet 12, whereas the outer case 10, which is not provided with the inlet 12, is provided with the outlet 13.

In the hollow-fiber membrane module M, for example, a dry gas 20 is supplied to the first flow path before it is used in a fuel cell. The dry gas 20 used in a fuel cell becomes an off-gas 22 as an exhaust gas. This off-gas 22 is supplied to the second flow path. Therefore, while the unused dry gas 20 passes in the hollow-fiber membranes 11, the humidified off-gas 22 passes the outsides of the hollow-fiber membranes 11 in the filling space. The hollow-fiber membranes 11 do not exchange gas between the inside and the outside thereof, but let only moisture migrate through fine pores existing on both surfaces thereof. Thus, the moisture migrates from the high humidity side to the low humidity side. According to the moisture migration, the unused dry gas 20 supplied to the first flow path is discharged as an unused humidified gas 21, and the humidified off-gas 22 supplied to the second flow path is discharged as an off-gas 23 with low humidity.

Figure 4:
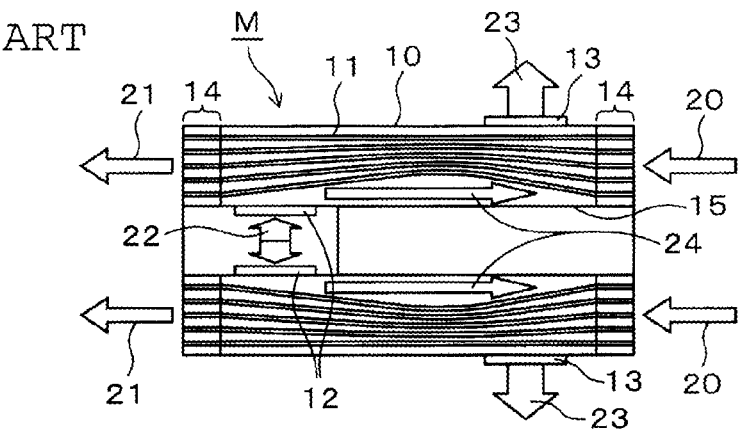
FIG. 4 is a sectional side view showing imbalance of hollow-fiber membranes in a conventional hollow-fiber membrane module for moisture exchange.

FIG. 4 is a view for illustrating the problems of a conventional hollow-fiber membrane module for moisture exchange. As described above, since the hollow-fiber membranes 11 swell by absorbing moisture and change in dimensions, the hollow-fiber membranes 11 in a dry condition are secured in the filling space at predetermined distances. The hollow-fiber membranes 11 can elastically deform. Therefore, as shown in FIG. 4, when the off-gas 22 is supplied from the inlet 12, pressure is increased at the side of the inner case 15, at which the gas flow rate is the greatest. As a result, the off-gas 22 pushes aside and deforms the hollow-fiber membranes 11, thereby forming large spaces along the inner case 15. Much of the off-gas flows to the downstream (the right side in FIG. 4) via these large spaces as shown by an arrow 24, and then the off-gas flows to the outlet 13 and is discharged. Thus, the off-gas does not pass through interspaces between the hollow-fiber membranes 11 at the upstream (the left side in FIG. 4), and the moisture migration occurs only at the downstream. Accordingly, a rate of using the hollow-fiber membranes 11 and the humidifying efficiency are low.

First Embodiment

Figure 5:
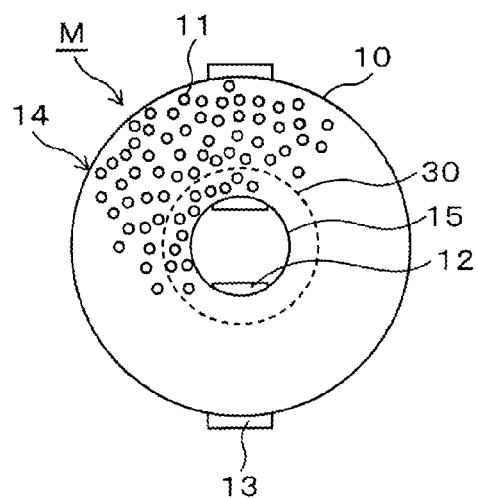
FIG. 5 is a schematic view showing arrangement of a tubular porous member in a hollow-fiber membrane module for moisture exchange relating to an embodiment of the present invention.

FIG. 5 shows an embodiment of a hollow-fiber membrane module for moisture exchange of the present invention, by which the above conventional problems can be solved. The hollow-fiber membrane module shown in FIG. 5 has the same components as those in FIGS. 1 to 3, except for a tubular porous member 30. Therefore, descriptions for the same components are omitted, and specific structure and effects in the First Embodiment will be described.

As shown in FIG. 5, the tubular porous member 30 is provided coaxially with the outer case 10 and the inner case 15 in the filling space, and it is inserted between the plural hollow-fiber membranes 11. The tubular porous member 30 has an opening ratio so as to let sufficient amount of the off-gas pass therethrough. The tubular porous member 30 has stiffness sufficient not to be deformed when it is subjected to the pressure of the off-gas, and it is made of a material that has good corrosion resistance for long periods. The tubular porous member 30 is, for example, formed of a mesh made of metal, such as stainless steel, or is formed of plastic, and is fixed by burying both ends in the sealing portions 14.

The sealing portions 14 of the present invention may be formed by any method and can be fixed by appropriate means. In this embodiment, a method of potting is used. First, the hollow-fiber membranes 11 and tubular porous members 30 to 33 are filled in the filling space in a condition in which the outer case 10 and the inner case 15 stand on the end portions. Then, lower end portions thereof are dipped in a resin and are fixed. Similarly, after the other end portions thereof are turned down, the end portions are dipped in the resin and are fixed. In the potting, the resin seals the insides and the outsides of the hollow-fiber membranes 11. In this case, the distances between the hollow-fiber membranes 11 are less than the diameter of the hollow-fiber membranes 11. The resin rises to different heights according to capillary action, and therefore, the insides of the hollow-fiber membranes 11 are shallowly sealed compared with the outsides thereof. Accordingly, by cutting off these portions, the insides of the hollow-fiber membranes 11 are made to communicate with the outside of the module, and the resin is made to remain only at the outsides of the hollow-fiber membranes 11. Thus, the filling space is sealed.

In this embodiment, a rate of swelling of the hollow-fiber membranes 11 due to the moisture is preliminary investigated. In order to reduce the movement of the hollow-fiber membranes 11, the hollow-fiber membranes 11 and the tubular porous member 30 are arranged so as to contact each other and be densely filled without interspaces when the rate of swelling is the greatest. Alternatively, the hollow-fiber membranes 11 and the tubular porous member 30 are arranged so as to decrease the distances therebetween and be filled at high density. On the other hand, in a dry condition, the hollow-fiber membranes 11 and the tubular porous member 30 are arranged so as to have interspaces (distances) therebetween.

As the hollow-fiber membranes 11 of the present invention, publicly known hollow-fiber membranes may be used. Specifically, hollow-fiber membranes made of polymer ion-exchange membrane, such as of phenolsulfonic acid, polystyrene sulfonic acid, polytrifluorostyrene sulfonic acid, and perfluorocarbon sulfonic acid, may be used. Moreover, hollow-fiber membranes made of a material, such as of polymer resin type and ceramic type, may be used.

According to this embodiment, the tubular porous member 30 surrounds the plural hollow-fiber membranes 11. Therefore, although the hollow-fiber membranes 11 in the vicinity of the inlet 12 receive the gas pressure when the off-gas is supplied from the inlet 12 to the filling space, the hollow-fiber membranes 11 between the tubular porous member 30 and the inner case 15 are prevented from moving. Thus, large spaces are not formed along the inner case 15, whereby the off-gas uniformly flows from the upstream to the downstream in the filling space. Accordingly, the rate of using the hollow-fiber membranes 11 and the humidifying efficiency are improved.

Specifically, in this embodiment, the hollow-fiber membranes 11 and the tubular porous member 30 are arranged so as to have predetermined distances based on the rate of swelling of the hollow-fiber membranes 11. Therefore, the hollow-fiber membranes 11 and the tubular porous member 30 contact each other while the hollow-fiber membrane module is operated, whereby formation of the large spaces along the inner case 15 is reliably prevented.

Second Embodiment

Figure 6:
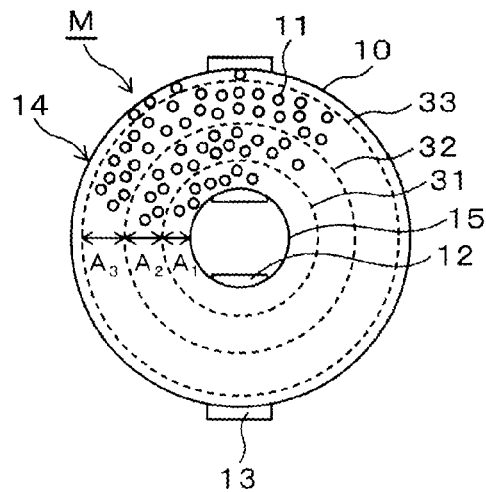
FIG. 6 is a schematic view showing arrangement of tubular porous members in a hollow-fiber membrane module for moisture exchange relating to another embodiment of the present invention.

FIG. 6 shows another embodiment of a hollow-fiber membrane module for moisture exchange of the present invention, and FIG. 6 shows an example in which plural tubular porous members are provided. As shown in FIG. 6, in the filling space, a first tubular porous member 31, a second tubular porous member 32, and a third tubular porous member 33 are provided coaxially with the outer case 10 and the inner case 15. As in the case of the First Embodiment, the tubular porous members 31 to 33 are formed of a mesh made of metal with corrosion resistance or of plastic, and the tubular porous members 31 to 33 are fixed by burying both ends into the sealing portions 14.

In the embodiment, a distance between the inner case 15 and the first tubular porous member 31 is expressed as $A_1$. In addition, a distance between the first tubular porous member 31 and the second tubular porous member 32 is expressed as $A_2$, and a distance between the second tubular porous member 32 and the third tubular porous member 33 is expressed as $A_3$. In this case, the distance $A_1$ at the innermost is made to be less than the other distances $A_2$ and $A_3$.

According to this embodiment, as in the case of the First Embodiment, the first tubular porous member 31 surrounds innermost hollow-fiber membranes 11. Therefore, although the hollow-fiber membranes 11 in the vicinity of the inlet 12 receive the gas pressure when the off-gas is supplied from the inlet 12 to the filling space, the movement of the hollow-fiber membranes 11 is reduced. Moreover, since the second tubular porous member 32 and the third tubular porous member 33 surround the hollow-fiber membranes 11 at the outside of the first tubular porous member 31, the movement of these hollow-fiber membranes 11 is also reduced. Accordingly, the rate of using the hollow-fiber membranes 11 and the humidifying efficiency are more improved than those in the case of the First Embodiment.

Specifically, in this embodiment, in the vicinity of the inlet 12 of the off-gas, the gas flow rate is the greatest, and the hollow-fiber membranes 11 receive large forces, whereby the hollow-fiber membranes 11 tend to move substantially. However, by making the distance $A_1$ be the smallest, the amount of movement of the hollow-fiber membranes 11 can be minimized.

In this embodiment, a relationship between the distances $A_2$ and $A_3$ is not limited as long as at least the distance $A_1$ is the smallest. For example, the distance $A_2$ may be the same as the distance $A_3$, or may be greater or less than the distance $A_3$. In particular, since the flow rate of the off-gas is decreased toward the outside, the distances $A_1$, $A_2$, and $A_3$ are preferably made to be greater in this order.

Other Examples

In the present invention, the plural tubular porous members are not limited to the first to the third tubular porous members, and an appropriate number of the first to the nth (n is an integer number that is not less than 2) tubular porous members may be provided. In this case, the distance $A_1$ is preferably less than the other distances $A_2$ to $A_n$, and more preferably, the distances $A_1$, $A_2$, ... $A_{n-1}$, and $A_n$ are made to be greater in this order, as in the case of the Second Embodiment.

In the above description, the unused dry gas is supplied to the first flow path, and the humidified off-gas is supplied to the second flow path, which is described as an example. However, the present invention is not limited to this embodiment. Therefore, the moisture may be exchanged by supplying the humidified off-gas to the first flow path and by supplying the unused dry gas to the second flow path.

The inlet 12 provided to the inner case 15 and the outlet 13 provided to the outer case 10 do not limit the flow direction of the gas to this direction. In the present invention, conversely, the gas may be supplied from the outlet 13 and may be discharged from the inlet 12. In this case, in FIG. 6, the outermost distance $A_3$ in a side, to which the gas is supplied, is preferably less than the distances $A_2$ and $A_1$ at the inner side. More preferably, the distances $A_3$, $A_2$, and $A_1$ are made to be greater in this order.

Figure 7A:
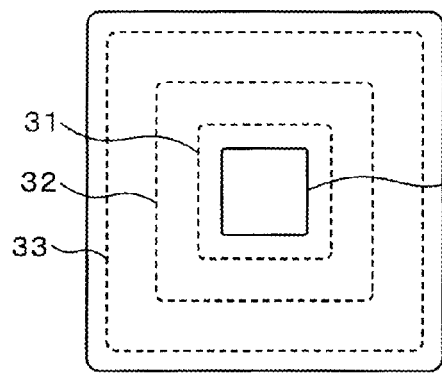
FIGS. 7A to 7F are sectional views showing other examples of an outer case, an inner case, and a tubular porous member of the present invention.
Figure 7B:
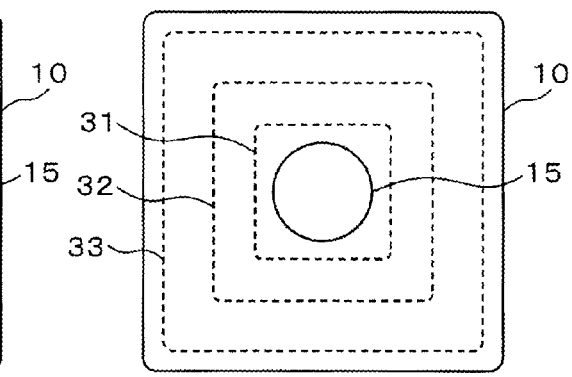
Figure 7C:
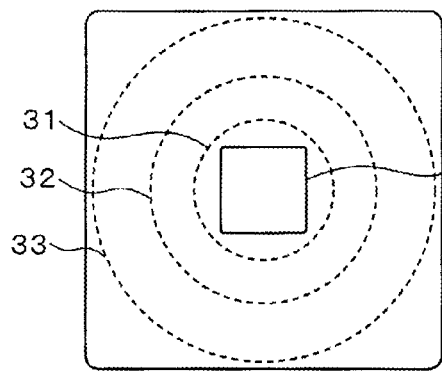
Figure 7D:
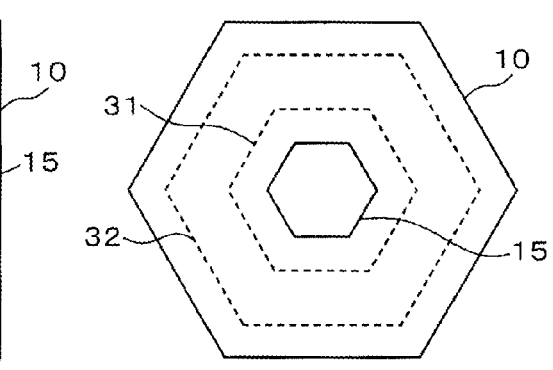
Figure 7E:
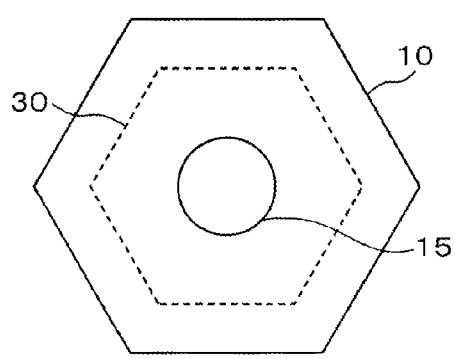
Figure 7F:
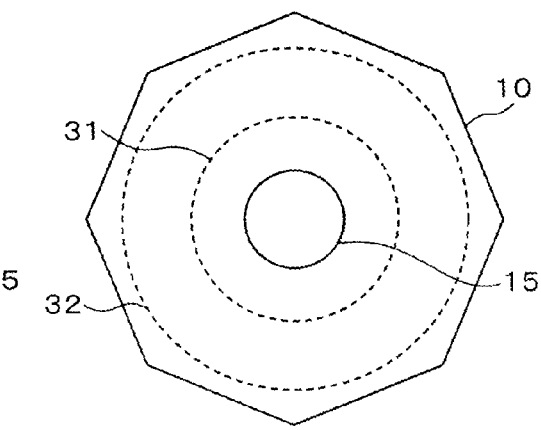

In the above description, a case of the outer case 10, the inner case 15, and the tubular porous members 30 to 33 having a circular tube shape is exemplified. However, the hollow-fiber membrane module for moisture exchange of the present invention is not limited to the circular tube shape and may have tube shapes with a polygonal cross section, for example. That is, the outer case 10 may have a four-sided shape as shown in FIGS. 7A, 7B, and 7C, or may have a hexagonal shape as shown in FIGS. 7D and 7E, and may have an octagonal shape as shown in FIG. 7F. In addition, the outer case 10 may have a tube shape with a polygonal cross section in a pentagonal shape or in a decagonal shape. The inner case 15 may have a four-sided shape as shown in FIGS. 7A and 7C, or may have a hexagonal shape as shown in FIG. 7D. In addition, the inner case 15 may have a tube shape with a polygonal cross section in a pentagonal shape, an octagonal shape, or a decagonal shape. Moreover, the tubular porous member may have a four-sided shape as shown in FIGS. 7A and 7B, or may have a hexagonal shape as shown in FIGS. 7D and 7E. The tubular porous member may have a tube shape with a polygonal cross section in a pentagonal shape, an octagonal shape, or a decagonal shape. The cross sectional shapes of the outer case 10, the inner case 15, and the tubular porous members 30 to 33 may be freely selected as shown in FIGS. 7A to 7F. For example, the four-sided shape, the circular tube shape, and the hexagonal shape may be combined.

INDUSTRIAL APPLICABILITY

According to the present invention, the moisture of the off-gas exhausted from a fuel cell is reused for humidifying the unused oxidant gas. Moreover, the humidifying efficiency in the moisture exchange is increased, whereby the fuel cell can be operated with an appropriate amount of the moisture. Accordingly, the present invention is extremely suitably used in an automobile fuel cell system in which precise stable operation is required.

The invention claimed is:

1. A hollow-fiber membrane module for moisture exchange, comprising:
    a tubular outer case;
    a tubular inner case coaxially contained in the outer case so as to have a space therebetween, the space having two ends;
    plural hollow-fiber membranes filled in the space and extending in the axial direction, the hollow-fiber membranes having two ends;
    sealing portions provided to both of the two ends of the space so as to fix the plural hollow-fiber membranes and to seal the space;
    an inlet provided to one of the inner case and the outer case;
    an outlet provided to one of the inner case and the outer case, which is not provided with the inlet;
    a first flow path extending from a side of a first end of the hollow-fiber membranes to a side of a second end of the hollow-fiber membranes via insides of the hollow-fiber membranes;
    a second flow path extending from the inlet to the outlet via outsides of the hollow-fiber membranes in the space; and
    at least three tubular porous members, in which diameters differ from each other, between the plural hollow-fiber membranes and extending in the space, the tubular porous members coaxially arranged with the outer case and the inner case,
    wherein dry gas which is not used in a fuel cell yet is supplied to the first flow path and humidified gas which is already used in a fuel cell is supplied to the second flow path so as to exchange humidity between the first and second flow paths.

2. The hollow-fiber membrane module for moisture exchange according to claim 1, wherein the at least three tubular porous members each have an end portion, and at least the end portions thereof are fixed by the sealing portion.

3. The hollow-fiber membrane module for moisture exchange according to claim 1,
    wherein the at least three tubular porous members, are provided in the space at predetermined distances
    wherein the inlet is provided to the inner case, the outlet is provided to the outer case, and
    wherein the distance between an innermost tubular porous member and the inner case is less than each of the distances between the other tubular porous members.

4. The hollow-fiber membrane module for moisture exchange according to claim 1,
    wherein the inlet is provided to the outer case,
    wherein the outlet is provided to the inner case,
    wherein the at least three tubular porous members are provided at predetermined distances, and
    wherein the distance between an outermost tubular porous member and the outer case is less than each of the distances between the other tubular porous members.

5. The hollow-fiber membrane module for moisture exchange according to claim 1, wherein the hollow-fiber membranes in a dry condition have distances therebetween and distances between the hollow-fiber membranes and the tubular porous member, and the hollow-fiber membranes in a swelled condition contact each other so as to decrease these distances.

6. The hollow-fiber membrane module for moisture exchange according to claim 1, wherein the at least three tubular members are each formed of a mesh.

* * * * *